Figure 1:
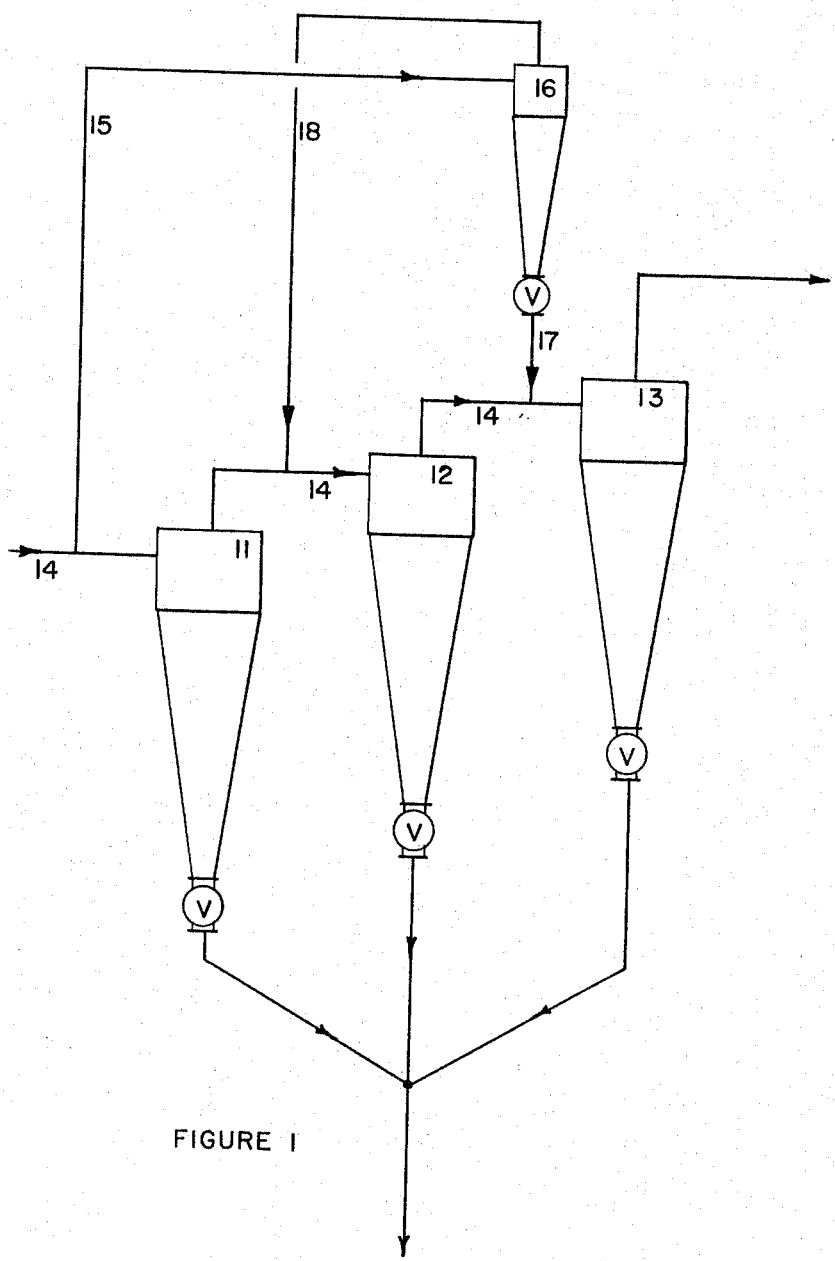

INVENTORS
K. ZEISS, D. WILM, W. FLASSKAMP, E. BROFT, A. LUKAS

United States Patent Office 3,318,070
Patented May 9, 1967

3,318,070
CYCLONE SEPARATION PROCESS AND APPARATUS
Karl Zeiss, Kronberg, Taunus, Diederich Wilm, Dortmund-Brechten, Willi Flasskamp, Stierstadt, Taunus, Eduard Broft, Frankfurt am Main, and Adam Lukas, Mannheim, Germany, assignors to Deutsche Gold- und Silber-Scheideanstalt vormals Roessler, Frankfurt am Main, Germany
Filed July 12, 1963, Ser. No. 295,294
Claims priority, application Germany, July 12, 1962, D 39,357
10 Claims. (Cl. 55—1)

This invention relates to process and apparatus for removing solids from gases. More precisely the invention disclosed herein relates to an improved process for removing solids of various sizes from gases in which they are entrained or dispersed. Included in the present invention are novel combinations of apparatus especially useful for achieving the improvements obtained in accordance with the practice of our process.

One of the methods of separating finely divided solids from gases is by means of a separation system consisting generally of two or more cyclone separators in series. In such a method of separation, it is well known that up to about 70 to about 80% by weight of the total solid particles entrained or suspended in the gas introduced thereto may be removed by the first cyclone separator of the series. As those well skilled in the art also know, the percentage of solids actually removed in the first cyclone separator will depend primarily on the grain loading of the stream introduced thereto. In turn, the grain loading of the stream is oftentimes determined by the nature of the solid involved. For example, in carbon black processes, the grain loading of the stream introduced to a cyclone separation system generally amounts to about 10 to 20 grains per cubic foot while if coarser blacks are involved grain loading of 30 grains or amounts somewhat higher per cubic foot may be utilized.

It is also generally well known that the greater portion of the particles removed in the first cyclone separator are the coarse to medium-fine particles. The degree of separation in the subsequent cyclone separators then drops off very sharply. For example, after the solids containing gas stream is passed through the second cyclone separator only about 90% by weight of the total solids initially present in the stream have been removed. If the stream is then introduced to a third cyclone separator then the effluent stream therefrom generally still contains about 5 to about 8% by weight of solids. In general, no significant further separation or removal is achieved by using more than 3 cyclone separators and usually the finer fractions are present in greater proportions in the second and third separators. Accordingly, in present cyclone separation systems, the recoverable yield of the solids suspended in the gaseous stream introduced thereto rarely exceeds about 95% by weight of the solids initially introduced thereto.

In some processes a degree of separation of solids from a gas of slightly above 90% efficiency is considered to be suitable and thus no special attempts are made in such processes to improve same. However, in most commercial processes such a degree of separation is unattractive especially from an economical view point. Accordingly, more often than not, it is necessary to improve the separation efficiency of cyclone separation systems. The most common method of improving the overall recovery efficiency of such systems usually involves the addition of some form of filtration apparatus such as bag filters, etc. Another more expensive method involves the installation of coagulation apparatus or mechanical or electrical precipitators both before and between the cyclone separators.

The principal object of the present invention is to provide an improved process for separating and removing solids of varying particle size entrained or suspended in gases or vapors.

Another object of the present invention is to provide a novel combination and arrangement of solid recovery means—especially a series of cyclone separation means—which is designed to achieve a highly efficient degree of separation and recovery of solids entrained or suspended in gases introduced thereto.

Other objects and advantages of the present invention will in part be obvious to those skilled in the art or will in part appear hereinafter.

The above objects and advantages are realized in accordance with the practice of our invention by introducing a gas stream having a solid suspended or entrained therein to a cyclone separation system comprising two or more—but preferably three—cyclone separators connected in series and while said solids containing gas stream is continually flowing through this separation system, continually supplying to the last cyclone separator in the series, a gaseous stream containing solid particles which are predominantly heavier than those normally in the stream introduced to the last cyclone separator after the stream has been subjected to the preceding portions of the separation system. In accordance with the practice of our invention, the overall efficiency of a separation system of cyclone separators in series is improved so much that in many cases the addition of supplementary filters or like auxiliary equipment mentioned above is no required and hence can be avoided.

We are unable to explain precisely why the addition of a coarser solid to the last cyclone separator of a series thereof so greatly improves the efficiency of such separation systems. However, we believe—and we do not wish to be bound by this explanation—that the high degree of success realized by the practice of our invention is due primarily to the fact that the coarser and generally heavier solid particles because of their greater mass and higher velocity collide much more frequently with the finer particles remaining in the stream introduced to the last separator. Accordingly, the agglomeration of the finer particles is greatly enhanced by the presence of the coarser particles and an almost complete separation thereof from the gas stream is effected in the final separator. The foregoing hypothesis is supported by our observations that the agglomeration of the finer particles in the last separator is favored when the coarser particles introduced thereto are those having irregular surfaces or having electrical charges generated by friction or otherwise or are slightly sticky in character.

The continuous supplying of the coarser solid particles to the last cyclone may be carried out in various manners. Some of the various manners will be better understood in reference to the attached drawings in which FIGURES 1, 2, 3 and 4 are flow diagrams illustrating schematically some integrated arrangements of apparatus suitable for practicing the process of our invention.

Referring now to FIGURE 1, three cyclone separators 11, 12 and 13 respectively are shown arranged in series. The solids containing gas stream is conveyed through the separation system by line 14. Before the gas stream enters the first separator 11, line 15 diverts a portion of the gas stream from line 14 to a coarse cyclonic separator 16 which removes only the coarser solid particles therefrom. The stream containing the finer particles not separated by separator 16 are recycled to the separation system by means of line 18 which communicates with line 14 at a point between separators 11 and 12. On the other hand, the coarser particles removed by separator 16 are conveyed to the last separator 13 by line 17 which communicates with line 14 at a convenient point between separators 12 and 13.

Figure 2:
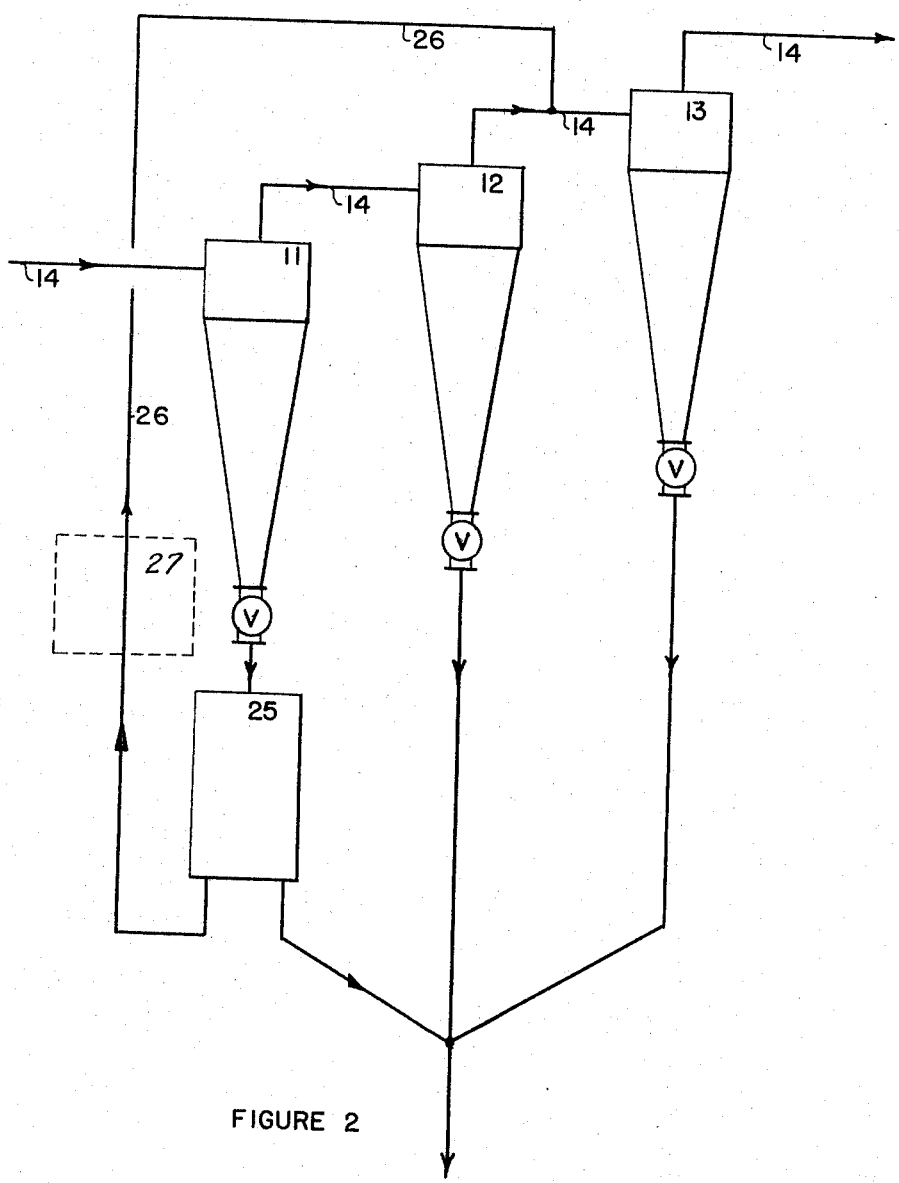

FIGURE 2 illustrates another arrangement suitable for enriching the stream delivered to the last cyclone separator with coarser solid particles. In accordance with the arrangement illustrated therein it is possible to condense part of the product separated from the stream by the first separator, for example, by forming beads and adding the coarse solids in this form to the last cyclone separator. A slight moistening of the coarse solid to be added to the last cyclone separator oftentimes greatly favors the agglomeration of the finer particles in the last separator.

Referring now to FIGURE 2 which illustrates the arrangement discussed above in more detail, line 14 conveys the solids laden gas system to cyclone separators 11, 12 and 13 arranged in series. The predominantly coarser solids separated in the first separator are filtered in filtration apparatus 25 arranged under first cyclone separator 11. The so separated coarser portion thereof is then conveyed from 25 through line 26 which joins line 14 at a point between separators 12 and 13. Before the coarser solids in line 26 are admitted to line 14, they may be treated to accentuate agglomeration thereof in an optional agglomerating zone indicated by dotted line box 27 which may include either means for generating electrical charges on said coarser solids or means for moistening same.

Figure 3:
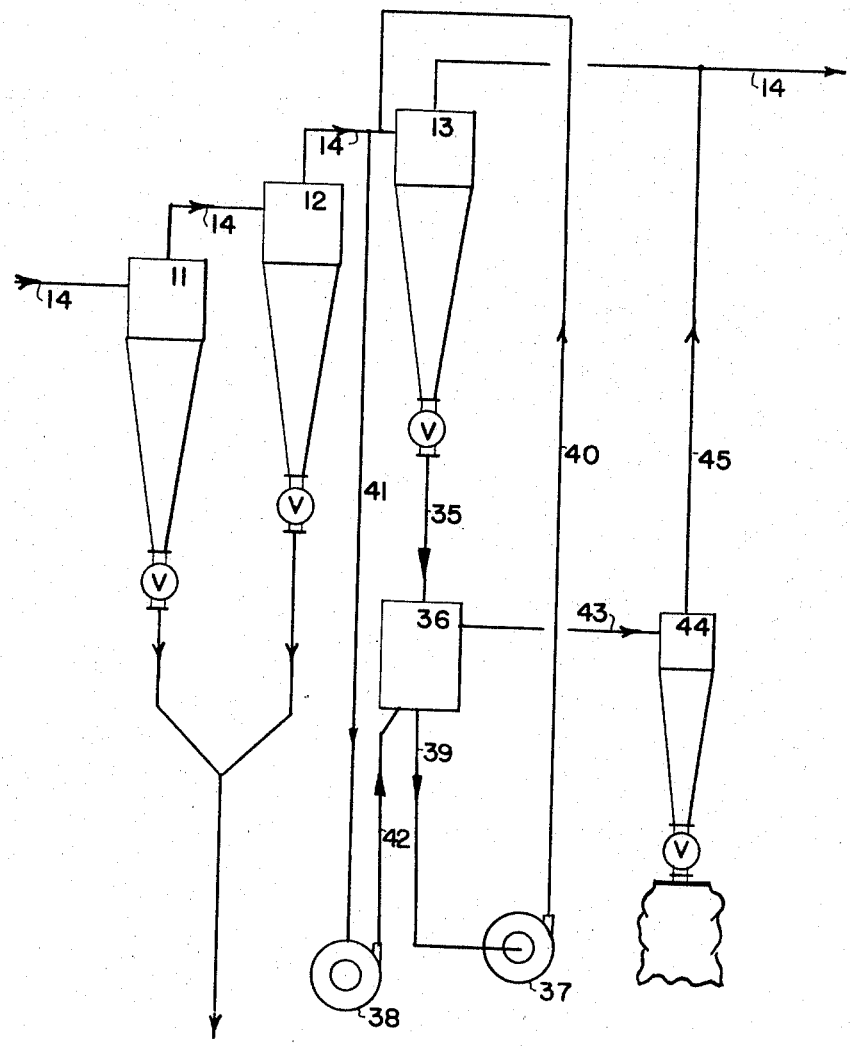

FIGURE 3 illustrates an arrangement of apparatus which is especially advantageous for removing solids from gases, which solids are particularly difficult to separate therefrom. In this arrangement, instead of using part of the coarser solids separated out in the separator series for enriching the fine solids stream delivered to the last cyclone separator, a foreign, generally inert, heavy solid such as fine sand is used. The foreign solid is precipitated out together with the fine particles in the last cyclone separator of the series. The so collected finer particles are then separated from the coarser and generally heavier foreign solid particles such as by a gas filtering technique. The coarse foreign particles are generally continually recycled to the last cyclone separator while the finer particles which are separated from the coarser prticles generally by blowing same off the foreign solid with a purified or semi-purified gas are conveyed to a suitable receptacle.

It should be understood that foreign inert solid particles somewhat coarser than fine sand may be utilized. Accordingly, the solids utilized may be somewhat greater than the dimension of fine sand if desired. However, the foreign solid particles added to the last cyclone separator in this aspect of our invention should not be too large or otherwise the number of collisions with the finer solid particles therewith will decrease, thus, lowering the efficiency of separation in the final cyclone separator. It is also desirable that the manner of adding the coarser solid particles be such so as to cause the formation of well defined barrier surfaces between the outer downward current and the inner upwards directed current which are present in cyclone separators. Such barriers prevent or greatly minimize the carrying along of the finer solid particles by the inner directed current in the separator.

Referring now to FIGURE 3, which describes in detail a method of achieving the above-described separation, line 14, as before, delivers the gas stream to cyclone separators 11, 12 and 13 respectively. An inert foreign solid such as fine sand is initially introduced to that portion of line 14 between separators 12 and 13 by way of line 40. As the separation continues, a mixture accumulates in the lower part of separator 13; this mixture consists of a foreign solid, e.g. fine sand and the finer solid particles remaining in the stream after same had previously gone through separators 11 and 12. The mixture is then conveyed to filter 36 through line 35. In filter 36, the sand and the fine particles are separated from each other by means of a small fraction of gas removed from the main gas stream 14 by way of lines 41 and 42 generally with the aid of a conveyor unit such as pump 38. After separation in filter 36, the foreign solid material is usually recirculated to separator 13 by way of line 39 with the aid of pump 37 which in turn delivers the separated coarser solid to line 14 via line 40. Once recirculation of the coarser solids to separator is obtained, the introduction of fresh amounts of additional foreign solid to the system by way of line 40 may be terminated if desired. The gas stream conveyed to filter 36 by way of line 42 and used in the filtration operation conveys the separated finer solids from filter 36 through line 43 into a supplementary separator 44 and after removal of the finer solids, the gas is returned to main gas stream line 14 through line 45 to be vented to the atmosphere.

Although all the cyclone separators shown in FIGURES 1 to 3 are shown as being arranged in series with respect to the main gas stream, nevertheless the process according to our invention may be varied so that the last cyclone separator may be divided into two or more smaller cyclone separators which may be arranged in parallel with respect to the main stream if desired. For example, referring now to FIGURE 4 it will be seen that the first two cyclone separators involved in the separation system 11 and 12 are arranged in series. Immediately following cyclone separator 12 are two smaller separators 54 and 62. The smaller separators 54 and 62 are arranged parallel with respect to the main stream line 14, but when viewed as a unit, these separators are in series.

Figure 4:
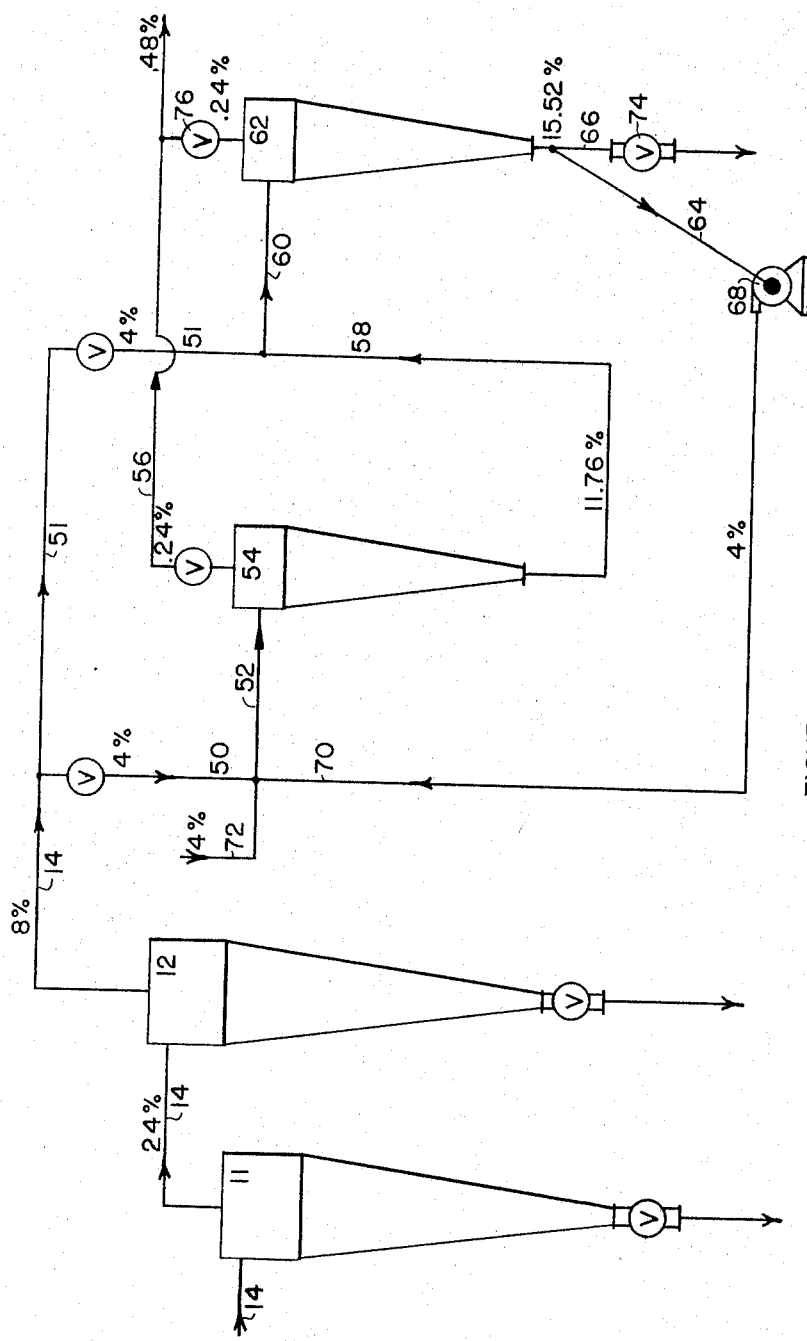

The following example is offered with reference to FIGURE 4 so that those well skilled in the art may better understand the practice of our invention and better appreciate the advantages to be derived therefrom. It is to be understood that the following example is illustrative in nature and in no way is it to be construed so as to limit our invention beyond those limitations expressly set forth in the present specification or in the claims which appear hereinafter.

*Example 1*

In the following example the degree of separation realized in the various separators and the amount of solids in the stream are expressed in terms of weight percent of the original amount of solids introduced to the first cyclone separator. Referring now to FIGURE 4, a gas stream containing the combustion products of a conventional carbon black furnace is introduced to cyclone separator 11 by way of line 14. In separator 11, 76% by weight of the initial solids contained in the gas stream introduced thereto are removed and accumulated therein while in separator 12, 16% are removed and also accumulated therein. Accordingly, the gas stream leaving separator 12 via common main stream line 14 contains an amount of solids equal to about 8% by weight of the initial solids. Common line 14 is then divided into two lines 50 and 51 respectively. Thus, the amount of solids in lines 50 and 51 represents about 4% by weight of the original solids.

The continuous addition of coarser solid particles to the last cyclone separation system may be carried out by any of the methods described in FIGURES 1 to 3. The amount of coarser solids in the gas stream introduced to separator 54 through line 72 is also an amount equal to about 4% by weight of the original solids. Because of the arrangement of the last separator system described here, the concentration of coarser particles introduced can be reduced without any decrease in efficiency since these coarser particles are introduced only into separator 54.

It will be seen from FIGURE 4 that separator 54 is not provided with a discharge unit such as 74 of separator 62. Also, it will be noted that line 64 located above discharge unit 74 removes a portion of the solids from separator 62 such as by suction pump 68. In turn the portion of the solids so removed is then conveyed through line 70 to converge with the streams conveyed through lines 50 and 72. In this example, the amount of solids in line 70 is also equal to about 4% by weight of the original solids introduced to the separation system by common line 14. Accordingly, at the point where lines 50, 70 and 72 meet, there is available an amount of solids equal to about 12% by weight of the original solids to be removed from the stream by separator 54. In separator 54 an amount of solids equivalent to about 11.76% by weight of the original solids is accumulated while an amount of solids equal to 0.24% by weight leaves the separator 54 by way of line 56. The amount of solids removed from the stream in separator 54 is then conveyed to separator 62 by way of line 58 and line 60. It will be noted that lines 51 and 58 unite with common line 60 and thus the amount of solids introduced to separator 62 is increased to an amount equal to 15.76% by weight by the addition of the 4% by weight of solids conveyed in line 51. Of the amount of solids introduced to second separator 62, an amount of solids equal to 15.52% by weight is removed from the stream while an amount equivalent to 0.24% by weight of initial solids leaves separator 62 by way of line 76. Of the total solids accumulated in separator 62, an amount equal to 11.52% by weight of the initial solids introduced to the system is removed completely from separator 62 by way of discharge 74 while 4% by weight is recirculated to separator 54. Since the total amount of solids lost from both separator 54 and 62 amounts to 0.48% by weight, this corresponds to a degree of separation of 99.52%.

It will be obvious to those well skilled in the art that many variations in the details offered for the purposes of illustrating our invention may be made without departing from the spirit and scope thereof.

Having described our invention together with preferred embodiments thereof, what we declare as new and desire to secure by U.S. Letters Patent is as follows:

1. In a process for the recovery of entrained carbon black particles from the original aerosol gas stream resulting from the carbon black forming process by conducting said gas stream directly from said forming process to the first of a series of cyclonic separating zones comprising a primary cyclonic separating zone in which the major portion of the entrained carbon black particles are separated out at least one secondary cyclonic separating zone, the improvement which comprises incorporating into said gas stream as it passes from the next-to-last to the last of the full series of said cyclonic separating zones a relatively substantial loading of solid particles coarser than most of the original carbon black particles still entrained in said gas stream as it leaves said next-to-last cyclonic separating zone.

2. The process of claim 1 wherein said series of cyclonic separating zones includes at least two secondary cyclonic separating zones.

3. The process of claim 1 wherein a portion of the heavier particles originally entrained in said gas stream are (a) separated out from a portion of said gas stream independently of said primary cyclonic separating zone and (b) employed as the coarser solid particles called for in the improvement step claimed.

4. The process of claim 1 wherein the coarser particles incorporated in said gas stream comprise a portion of the particles collected in said primary cyclonic separating zone.

5. The process of claim 4 wherein said coarser particles are agglomerated prior to being incorporated in said gas stream.

6. The process of claim 4 wherein said coarser particles are moistened before being incorporated in said gas stream.

7. The process of claim 4 wherein said coarser particles are treated to induce electrical charges thereon before being incorporated in said gas stream.

8. The process of claim 1 wherein said coarser particles incorporated in said gas stream are inert.

9. The process of claim 8 wherein said inert particles are sand.

10. The process of claim 8 wherein said inert coarser particles are recovered from said last zone by separating same from the finer particles collected therewith and are continuously recycled and reincorporated in said gas stream before it enters said last zone.

References Cited by the Examiner

UNITED STATES PATENTS

| | | | |
|---|---|---|---|
| 1,890,070 | 12/1932 | Whiton | 55—346 |
| 2,316,043 | 4/1943 | Billings et al. | 23—313 |
| 2,391,863 | 1/1946 | Bowen | 55—345 |
| 2,701,056 | 2/1955 | Morton | 55—345 |
| 2,717,658 | 9/1955 | Bethea et al. | 55—43 |
| 2,771,158 | 11/1956 | Bray et al. | 55—345 |
| 2,785,964 | 3/1957 | Pollock | 55 |
| 2,897,918 | 8/1959 | Schlotthauer et al. | 55—69 |
| 3,049,343 | 8/1962 | Helming | 55—345 |

FOREIGN PATENTS

| | | |
|---|---|---|
| 1,286,172 | 1/1962 | France. |
| 866,898 | 2/1953 | Germany. |

REUBEN FRIEDMAN, *Primary Examiner.*

B. NOZICK, *Assistant Examiner.*